（12） United States Patent
Dobermann

(10) Patent No.: US 12,169,321 B2
(45) Date of Patent: Dec. 17, 2024

(54) OPTICAL ASSEMBLY HAVING OPTICAL ELEMENTS WHICH ARE MOVABLE IN A GUIDED MANNER, AND METHOD FOR MOVING A FIRST OPTICAL ELEMENT AND A SECOND OPTICAL ELEMENT IN A GUIDED MANNER

(71) Applicant: Carl Zeiss Jena GmbH, Jena (DE)

(72) Inventor: Dirk Dobermann, Weimar (DE)

(73) Assignee: Carl Zeiss Jena GmbH, Jena (DE)

( * ) Notice: Subject to any disclaimer, the term of this patent is extended or adjusted under 35 U.S.C. 154(b) by 649 days.

(21) Appl. No.: 17/433,476

(22) PCT Filed: Feb. 14, 2020

(86) PCT No.: PCT/EP2020/053899
§ 371 (c)(1),
(2) Date: Aug. 24, 2021

(87) PCT Pub. No.: WO2020/173720
PCT Pub. Date: Sep. 3, 2020

(65) Prior Publication Data
US 2022/0137317 A1    May 5, 2022

(30) Foreign Application Priority Data
Feb. 28, 2019  (DE) .......................... 102019105125.8

(51) Int. Cl.
*G02B 7/02*    (2021.01)
*G02B 7/00*    (2021.01)
(52) U.S. Cl.
CPC ............. *G02B 7/023* (2013.01); *G02B 7/005* (2013.01)

(58) Field of Classification Search
CPC ................................ G02B 7/005; G02B 7/023
(Continued)

(56) References Cited

U.S. PATENT DOCUMENTS 7,729,067 B2    6/2010  Kuo et al.
2002/0063971 A1*  5/2002  Imanari ................. G02B 7/102
                                         359/821

(Continued)

FOREIGN PATENT DOCUMENTS

CN      101196600 A    6/2008
DE      102008001892 A1   11/2009
(Continued)

OTHER PUBLICATIONS

International Preliminary Report on Patentability rendered by the International Bureau of WIPO for PCT/EP2020/053899, dated Aug. 25, 2021, 6 pages.
(Continued)

*Primary Examiner* — Wyatt A Stoffa
*Assistant Examiner* — Mitchell T Oestreich
(74) *Attorney, Agent, or Firm* — Skaar Ulbrich Macari, P.A.

(57) ABSTRACT

An optical assembly having at least a first optical element and a second optical element, both of which are arranged to be movable in a guided manner, is provided. A guide common to both optical elements is present, which provides a guide path that is common to both optical elements during the guided movement of the first optical element and during the guided movement of the second optical element.

21 Claims, 8 Drawing Sheets

(58) Field of Classification Search
USPC .......................................................... 359/819
See application file for complete search history.

(56) References Cited

U.S. PATENT DOCUMENTS

| | | | |
|---|---|---|---|
| 2010/0091391 A1* | 4/2010 | Schwab | G02B 7/023 |
| | | | 359/823 |
| 2013/0278911 A1 | 10/2013 | Limbach et al. | |
| 2017/0227747 A1 | 8/2017 | Zhou et al. | |

FOREIGN PATENT DOCUMENTS

| | | |
|---|---|---|
| DE | 102013101711 A1 | 8/2014 |
| DE | 102014118383 A1 | 6/2016 |
| DE | 102015116895 B3 | 11/2016 |
| EP | 1811325 A1 | 7/2007 |
| WO | 9634306 A1 | 10/1996 |
| WO | 2007037691 A2 | 4/2007 |
| WO | 2013064679 A2 | 5/2013 |
| WO | 2018040889 A1 | 3/2018 |

OTHER PUBLICATIONS

Wikipedia, "Balgengeraet" (English version "Ballows (photography)", retrieved Jun. 3, 2020, 3 pages.

* cited by examiner

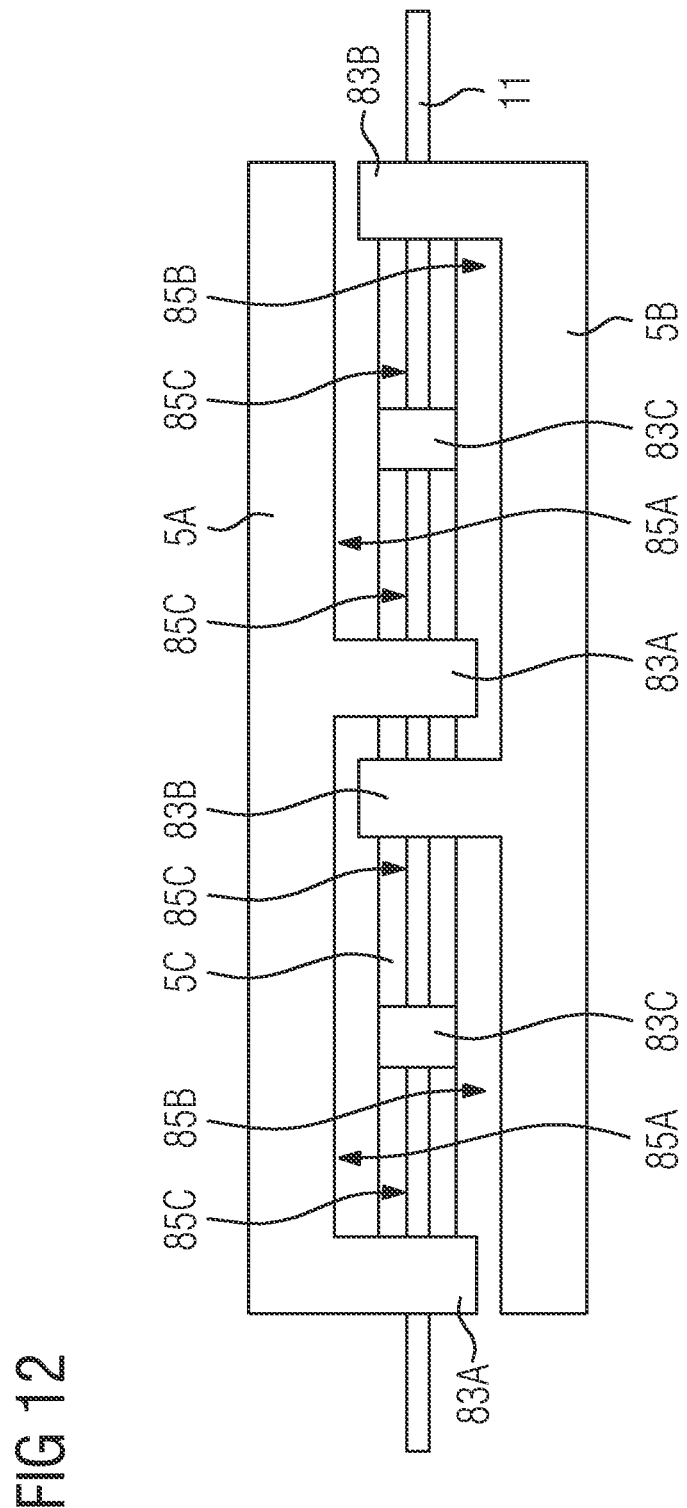

OPTICAL ASSEMBLY HAVING OPTICAL ELEMENTS WHICH ARE MOVABLE IN A GUIDED MANNER, AND METHOD FOR MOVING A FIRST OPTICAL ELEMENT AND A SECOND OPTICAL ELEMENT IN A GUIDED MANNER

PRIORITY

This application claims the benefit of German Patent Application No. 10 2019 105 125.8, filed on Feb. 28, 2019, and which is hereby incorporated herein by reference in its entirety.

FIELD

The present invention relates to an optical assembly having a first optical element and a second optical element, which are arranged to be movable in a guided manner.

BACKGROUND

To expand the function of optical systems, optical assemblies can be used which have two optical elements which are displaceable relative to one another with respect to the optical axis, in particular two optical elements which are displaceable relative to one another perpendicular to the optical axis. The displaceable optical elements can also be elements with free-form surfaces, which are sometimes referred to as Alvarez elements. Optical systems having such assemblies are described, for example, in DE 10 2008 001 892 A1, WO 2007/037691 A2, US 2017/0227747 A1, and US 2013/0278911 A1. With the aid of optical elements having free-form surfaces it is possible to correct for example aberrations for different focal planes in a targeted manner, as is described in DE 10 2013 101 711 A1. In addition, optical elements with free-form surfaces that are displaceable perpendicular to the optical axis also offer the possibility of deliberately introducing aberrations into an optical system, for example to bring about a soft focus effect in a photo lens. This is described, for example, in DE 10 2014 118 383 A1. A similar use of optical elements with free-form surfaces that are displaceable perpendicular to the optical axis is described in DE 10 2015 116 895 B3.

The movement when displacing the optical elements perpendicular to the optical axis is often only by a few millimeters. Very high demands are placed on the movement in terms of its guidance accuracy. With a travel of more than 3 mm, the deviation should typically be less than 1μ. To achieve this, both the positions and the guide path of each optical element are adjusted relative to the optical system. Since the adjustment of the guide path of an optical element influences its position and vice versa, there must be coupled adjustment points, which complicates the adjustment. Furthermore, the adjustment elements, such as adjustment screws, remain in the optical system after the adjustment has been completed. The result is an increased space requirement. In addition, settling phenomena occurring during the service life of the optical system can make readjustment necessary. The adjustment described is therefore complex and cost-intensive and is thus suitable only to a limited extent for series production.

An optical assembly having two optical elements is known from WO 2013/064679 A2, in which one of the optical elements has a guide groove and a guide rail. The other optical element has a projection protruding into the guide groove and a guide rail engaging in the guide rail of the first optical element.

SUMMARY

It is an object of certain embodiments to provide an optical assembly for an optical system that may include a first optical element and a second optical element, which are each arranged to be movable in a guided manner, in which at least some of the disadvantages described with respect to the prior art are overcome or at least reduced and in which the number of guided optical elements is not limited to two.

It is an object of certain embodiments to provide a wavefront manipulator for manipulating the wavefront of an electromagnetic wave, in which an advantageous guide of its optical elements is implemented that overcomes or at least reduces at least one of the disadvantages mentioned with reference to the prior art and in which the number of guided optical elements is not limited to two.

Another object is to provide a method for the guided movement of a first optical element and of a second optical element that overcomes or at least reduces at least one of the disadvantages mentioned with reference to the prior art and in which the number of the guided optical elements is not limited to two.

An optical assembly can include at least one first optical element, which can be designed as a transmissive or reflective optical element, and a second optical element, which can likewise be designed as a transmissive or reflective optical element. The optical elements are each arranged to be movable in a guided manner. The optical elements of the optical assembly can in particular be arranged here one behind the other along an axis and can be guided in a movable manner parallel to a plane perpendicular to the axis. In the optical assembly according to the invention, a common guide for at least two of the optical elements of the optical assembly is present, which provides a guide path common to the two optical elements during guided movements. In this case, the guide path is the path along which the guidance takes place and clearly defines the movement paths along which the optical elements move. The movement paths do not need to be identical to one another here. If, for example, the optical elements are arranged one behind the other along an axis and are movable parallel to a plane perpendicular to this axis, the movement paths can be spaced apart, but the movement paths are fixed relative to one another due to the common guide path. A guide in the sense of the present invention is here understood to be any device that, when a body is repositioned, leads to the repositioning taking place along a predetermined movement path. The specified movement path is here uniquely linked to the guide path. The guide path can be straight or curved within the scope of the invention, with the result that a guided linear movement of the two optical elements or a guided curved movement of the two optical elements, for example a complete circular movement or a movement along a circular arc, is able to be implemented.

Guiding the at least two of the optical elements of the optical assembly along a common guide path with the aid of a common guide renders any adjustment of the movement paths of the optical elements relative to one another superfluous. The assembly according to the invention therefore typically requires merely independent adjustment options for the location of the at least two optical elements with the common guide relative to one another and for the common guide path. Since the guide acts on both optical elements, it is not necessary to adjust the guide paths of the optical elements relative to one another. This reduces the time required for the adjustment. In addition, the reduction in the number of adjustment options leads to a reduction in the complexity of the optical assembly, which at the same time increases the stiffness of the mechanical structure. The greater stability and stiffness here result from the fact that fewer mechanical components are required. This contributes significantly to the reduction of the series production costs. In addition, the common guide path ensures great long-term stability, since settling phenomena are reduced.

The common guide comprises at least one guide element at which the at least two optical elements with the common guide are each supported by means of bearing elements. The bearing elements can form part of a plain or a roller bearing. The guide element along which the bearing elements slide or roll defines the guide path. With regard to the complexity of the optical assembly, it is advantageous if plain bearings are used so that the bearing elements only need to be bearing surfaces. By contrast, roller bearings cause less friction but are more complex in terms of construction, which increases the series production costs compared to the use of plain bearings. In general, the choice of the type of bearing can be made depending on the available installation space and the requirements relating to the actuating movement, such as the number of actuating cycles, actuating dynamics, service life, wear behavior, particle immission, etc. The plain bearings already mentioned are particularly suitable for very small installation spaces, although the adjustment speed is lower than that of a roller bearing and is at most approx. 1 m/s.

Since a guide element that is separate from the optical elements is present, no guiding contact is required between the guided optical elements, unlike with the guide known from WO 2013/064679 A2, which means that more than two optical elements can be guided along the same guide path. The guide geometry is here not located directly at the optical element but is connected to it. The separate guide geometry allows highly precise machining of the guide geometry (guide path), which enables a very precise guide movement.

The bearing elements can be formed directly on the at least two optical elements with the common guide. However, due to their wear behavior, the typical materials of refractive optical units in particular, i.e. mineral or organic glasses, are not optimal for the construction of guides having permanently good bearing properties. In an alternative embodiment, the at least two optical elements with the common guide can therefore each be arranged in a mount. The bearing elements are then formed on the mounts. In this way, the mounts can form carriages, with the aid of which the optical elements can be moved in each case along the common guide path. This variant is advantageous in particular with regard to wear and from the point of view of manufacturing and series production costs.

The at least one guide element can comprise at least one guide rail, on which the optical elements with the common guide are mounted in each case by means of the bearing elements. In particular, the at least one guide element can comprise at least a first guide rail and a second guide rail, wherein the at least two optical elements with the common guide are then each supported by means of the bearing elements both at least on the first guide rail and on the second guide rail. Two guide rails are advantageous insofar as any forces or torques acting on the optical elements or their mounts through the guide act symmetrically.

In one embodiment variant, the at least one guide rail is designed as at least one guide rod, which is at least partially encompassed by the bearing elements. The bearing elements can include rolling bodies engaging the at least one guide rod. Alternatively, the bearing elements can be bearing surfaces which are in contact with the guide rod. In particular, the guide rod can be contacted by the bearing surfaces in such a way that a 3-point bearing is provided. In this embodiment variant, the guide element has a structure that is particularly easy and inexpensive to produce. The cross section of the at least one guide rod can be round, elliptical, polygonal, etc., wherein the cross section of the at least one guide rod can in particular also be adapted to the type of the bearing elements used. In order to keep frictional contact between the at least one guide element and the bearing surfaces low, it is advantageous in all embodiment variants with bearing surfaces as the bearing elements if the at least one guide element is made contact with by the bearing surfaces in such a way that a 3-point bearing is provided. In addition, a 3-point bearing can ensure self-adjustment of the bearing surfaces relative to the guide element.

In one embodiment variant, the at least one guide rail has at least one guide groove, and the bearing elements are designed as projections engaging in the at least one guide groove. Rolling bodies such as balls, cylinders or needles can be arranged between the at least one guide groove and the projections engaging in the at least one guide groove.

For the reliable contact between the bearing elements on the one side and the at least one guide element on the other side, the at least one guide element and the bearing elements can be pretensioned against one another. It is advantageous if the pretension forces act only at the contact points between the bearing elements and the at least one guide element, since deformations of the optical elements or their mounts can be avoided in this way. Reliable contact can additionally or alternatively also be achieved in that the bearing elements and the at least one guide element are paired in a form-fitting manner.

In order to prevent corrosion or optical contact bonding to the bearing elements and the at least one guide element and to counteract the generation of frictional heat, suitable material pairings can be used for the bearing elements and also for the at least one guide element. However, it is more advantageous to use the same materials, since this means that different coefficients of thermal expansion can be avoided. In this case it is also advantageous if the bearing elements and/or the at least one guide element have a friction-reduced surface layer, that is to say a sliding coating, for example Teflon or the like. If the sliding coating is applied both to the bearing elements and to the at least one guide element, then, once applied, it can additionally be reworked jointly for the bearing elements and the at least one guide element, which enables the highest possible guide accuracy.

In a particular embodiment of the optical assembly, in each of the at least two optical elements with the common guide, the bearing elements each have at least one cutout or interruption extending along the at least one guide element. At least one bearing element of at least one of the at least two optical elements with the common guide is arranged in said cutout or interruption. In this case, the cutout or interruption has a larger dimension along the at least one guide element than the bearing element arranged in the cutout or interruption. In this way, the bearing element arranged in the cutout or interruption is not prevented from moving, so that the movement of the at least two optical elements with the common guide relative to one another is not hindered. This particular configuration makes possible self-centering and an approximately symmetrical distribution of the frictional forces occurring during guidance.

The optical assembly can also comprise a drive device acting on at least one of the at least two optical elements with the common guide at least indirectly, in the presence of a mount for example via that mount, for introducing an actuating force which brings about the guided movement. In this way, the optical assembly does not need to have an interface with an external gear unit. The drive device can include, for example, a linear drive or a rotationally acting drive. If the movement of the optical elements is a linear movement, but the drive device comprises a rotationally acting drive, the optical assembly additionally has a gear unit that converts a rotary movement into a linear movement.

The drive device of the optical assembly can comprise a separate drive for each of the at least two optical elements with the common guide. This is advantageous to the extent that, when separate drives are used, the actuating movement is available over the entire usable range of movement and thus forms a degree of freedom of adjustment. As a result, the requirements regarding the tolerances of the individual parts and the adjustment are lower.

In order to be able to correct the location of the optical elements, it is advantageous if the optical assembly comprises at least one detector for detecting the positions of the at least two optical elements with the common guide. Any incorrect positioning that occurs due to wear can then be compensated for, for example as part of closed-loop control, by means of an actuating movement.

In order to be able to avoid incorrect positioning due to forces acting on the optical elements, which are brought about by shifting cables, it is advantageous if elements that are to be supplied with electricity and are comprised by the optical assembly are arranged in such a spatially fixed way that they do not move with the at least two optical elements with the common guide during their guided movement.

A wavefront manipulator for manipulating the wavefront of an electromagnetic wave is additionally provided. The wavefront manipulator can include an optical assembly according to the invention for manipulating the wavefront. For this purpose, the optical elements of the optical assembly can in particular be provided with free-form surfaces. A free-form surface is understood in the broader sense to be a complex surface that can be represented in particular by means of regionally defined functions, in particular twice continuously differentiable regionally defined functions. Examples of suitable regionally defined functions are (in particular piecewise) polynomial functions (in particular polynomial splines, such as bicubic splines, higher-degree splines of the fourth degree or higher, or polynomial non-uniformly rational B-splines (NURBS)). These are to be distinguished from simple surfaces, such as spherical surfaces, aspherical surfaces, cylindrical surfaces, toric surfaces, which are described as a circle at least along a main meridian. In particular, a free-form surface does not need to have axial symmetry or point symmetry and can have different values for the mean surface refractive power in different regions of the surface. The production of a free-form surface on an optical element is usually done by machining the optical element, i.e. by milling, as part of a CNC process in which the free-form surface is produced numerically controlled on the basis of a mathematical description of the surface. However, it is also possible to produce the free form by glass molding. For this purpose, the negative mold must be machined with the appropriate additions for temperature-dependent shrinkage using a CNC process.

Also provided is a method for the guided movement of at least a first optical element and a second optical element. The optical elements here can be either transmissive optical elements or reflective optical elements. In particular, they can be arranged one behind the other along an axis and can be moved parallel to one another parallel to a plane extending perpendicularly to the axis. According to the invention, at least two of the optical elements of the optical assembly are moved on the basis of a guide that is common to these optical elements and provides a guide path that is common to the corresponding optical elements.

The advantages associated with the method correspond to those that have been described with reference to the optical assembly. Reference is made to the relevant part of the description in order to avoid repetition.

Further features, properties and advantages of the present invention will become apparent from the following description of exemplary embodiments with reference to the accompanying figures.

BRIEF DESCRIPTION OF THE DRAWINGS

FIG. 12 shows an exemplary embodiment for an optical assembly having three movable optical elements, in which a guide common to the three optical elements is present, in a schematic illustration.

Figure 1:
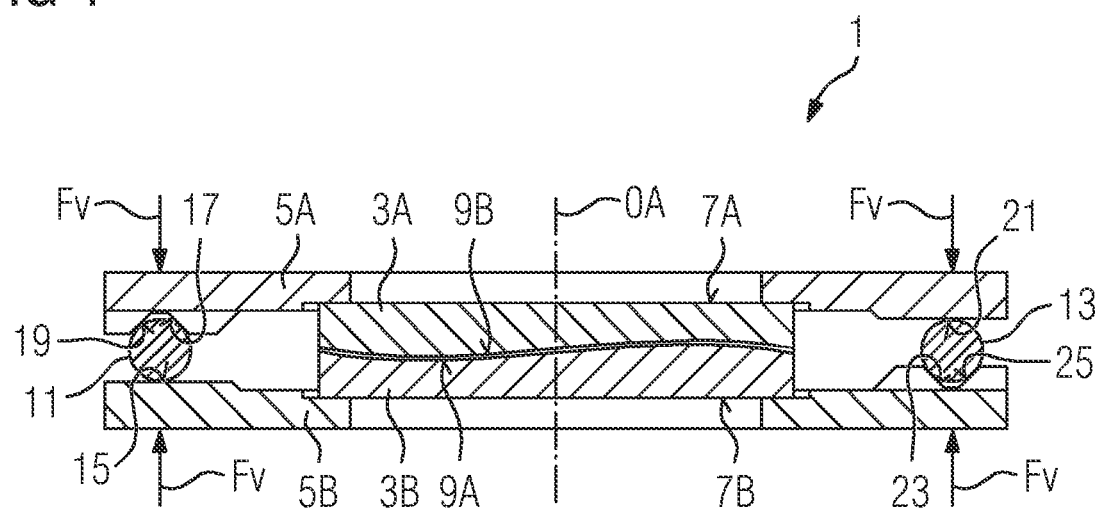
FIG. 1 shows a first exemplary embodiment for an optical assembly having two movable optical elements, in which both optical elements are guided together, in a sectional view.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various exemplary embodiments. Nevertheless, these embodiments are not intended to limit the present invention to any specific example, environment, application, or particular implementation described herein. Therefore, descriptions of these example embodiments are only provided for purpose of illustration rather than to limit the present invention.

The present invention is described below on the basis of exemplary embodiments, which show different guides for the optical elements. FIGS. 1 to 4 show exemplary embodiments having guides that comprise guide rails in the form of guide rods, and FIGS. 5 to 8 show exemplary embodiments having guides that comprise guide rails having guide grooves. Although only guides with linear guide paths are described in the exemplary embodiments, a person skilled in the art recognizes that the underlying principles can also be used for guides that provide curved guide paths, in particular, but not exclusively, circular guide paths.

Figure 2:
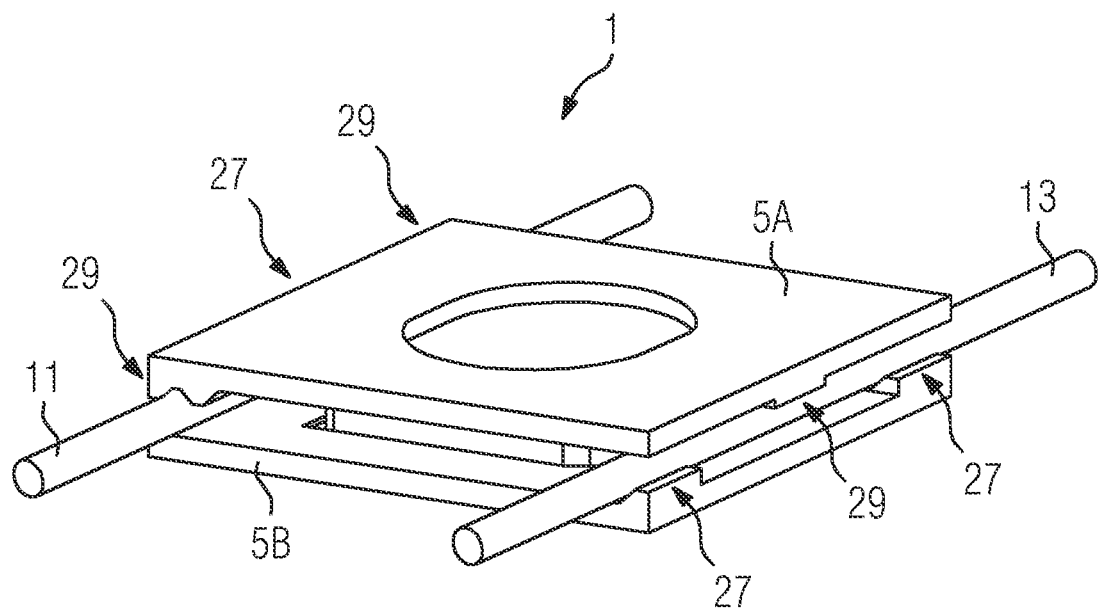
FIG. 2 shows the optical assembly from FIG. 1 in a perspective view.

FIGS. 1 and 2 show a first exemplary embodiment for an optical assembly 1 according to the invention. The optical assembly 1 comprises two optical elements 3A and 3B, which are each arranged in a mount 5A, 5B. Each of the optical elements 3A, 3B has a plane surface 7A, 7B and a free-form surface 9A, 9B, wherein the optical elements in the present exemplary embodiment 3A, 3B are arranged in such a way that their free-form surfaces face one another. However, they can also be arranged on the sides facing away from one another, or free-form surfaces can be arranged on both sides of an optical element 3A, 3B. The optical elements 3A, 3B with the free-form surfaces 9A, 9B are arranged one behind the other along an optical axis OA and are mounted to be displaceable parallel to a straight line extending perpendicular to the optical axis OA.

The optical elements 3A, 3B serve as a wavefront manipulator, in which the degree of manipulation effect on the wavefront depends on the degree of displacement of the optical elements 3A, 3B along the straight line. Typically, the displacement of the optical elements 3A, 3B to bring about the wavefront manipulation takes place along the straight line by the same amount, but in opposite directions. For the purposes of fine correction, however, it can be advantageous if each optical element can be displaced by individual amounts. By manipulating the wavefront, for example, aberrations of the optical system in which the optical assembly 1 is installed can be compensated. The correction to the strength of the aberration that occurs can be compensated for by the amount of the displacement of the two optical elements 3A, 3B. If the optical elements 3A, 3B can be displaced by individual amounts, it is also possible to perform an optical fine correction. The compensation of aberrations by the displacement of the optical elements of a wavefront manipulator is described in DE 10 2013 101 711 A1. Reference is therefore made to that document with respect to compensating for aberrations.

As an alternative to compensating for aberrations, it is possible to introduce an aberration into the optical system in which the optical assembly 1 is installed by displacing the optical elements 3A, 3B in opposite directions, for example in order to bring about a spherical aberration in a soft focus lens, which leads to a soft focus effect. How such a soft focus effect can be brought about is described in DE 10 2014 118 383 A1. Reference is therefore made to that document with respect to bringing about a soft focus effect.

A high degree of precision is required when moving the optical elements 3A, 3B. With individual travels of the optical elements 3A, 3B of typically more than 3 mm, the deviations from the set position should, if possible, not be more than 5 µm and preferably be less than 1 µm. In order to accomplish this, a highly precise adjustment of both the positions of the optical elements 3A, 3B and of the movement paths of the optical elements 3A, 3B is necessary in order to ensure that the optical elements have the correct travel and occupy the correct position in the optical component after every displacement.

In order to render an adjustment of the movement paths of the optical elements 3A, 3B relative to one another superfluous, the optical component 1 has a guide common to both optical elements 3A, 3B, which, when the first optical element 3A and the second optical element 3B move, provides a guide path that is common to both optical elements 3A, 3B. The common guide path ensures here that the actuating movements of the optical elements 3A, 3B are always adjusted relative to one another. A misalignment of the movement paths relative to one another is not possible in this case, because the guide paths of the two optical elements cannot reposition themselves relative to one another.

The common guide path not only eliminates the need to adjust the movement paths of the optical elements 3A, 3B relative to one another, as would be the case if each of the optical elements 3A, 3B had its own guide with its own guide path, but also reduces the number of components of the optical assembly 1. The resulting reduced complexity of the optical assembly 1 reduces the manufacturing costs, which is advantageous in particular with regard to series production.

In the present exemplary embodiment, the common guide path is formed by two parallel guide elements in the form of guide rods 11, 13, against which bearing surfaces 15, 17 and 19 or 21, 23 and 25 of the mounts 5A, 5B lie. The guide rods 11, 13 form guide rails on which the bearing surfaces 15, 17, 19 and 21, 23, 25 designed as slide surfaces slide during an actuating movement of the optical elements 3A, 3B. In order to facilitate sliding, the slide surfaces 15, 17, 19, 21, 23, 25 in the present exemplary embodiment are provided with a friction-reducing coating, for example with a PTFE coating (PTFE: polytetrafluoroethylene). Additionally or alternatively, the guide rods 11, 13 can also be provided with a friction-reducing coating, for example a PTFE coating. The bearing surfaces 15, 17, 19, 21, 23 and 25 represent bearing elements which, together with the guide rods 11, 13, form the guide for the optical assembly. The bearing points themselves are preferably listed as 3-point contacts, that is to say, the bearing surfaces 15, 17, 19, 21, 23 and 25 make contact with the guide elements, here the guide rods 11, 13, at three points of their cross section by the bearing elements. In the present exemplary embodiment, this is achieved in that the bearing surfaces 17, 19 and 23, 25 form a V-shaped groove that extends in the desired movement direction and lies opposite the respective third bearing surface 15, 21.

Although the guide rods in the present exemplary embodiment have a circular cross section, they can in principle have other cross sections. Alternative cross sections are, for example, elliptical cross sections, polygonal cross sections or irregular cross sections, without the alternative cross sections being restricted to these named cross sections.

When the optical assembly 1 is installed in an optical device, the guide rods 11, 13 are firmly connected to the housing of the optical device so that the guidance takes place in a manner defined with respect to the optical axis of the optical device, which typically coincides with the optical axis OA of the optical assembly.

In order to ensure reliable contact of the bearing surfaces 15, 1, 19, 21, 23, 25 with the guide rods 11, 13, the mounts 5A, 5B are pretensioned against one another. The pretensioning forces $F_v$ introduced into the mounts for pretensioning are preferably introduced into the mounts 5A, 5B in the region of the contact points of the bearing surfaces 15, 17, 19, 21, 23, 25 with the respective guide rod 11, 13 in order to avoid deformation of the mounts 5A, 5B due to the introduced forces, or at least to keep it as low as possible.

In the exemplary embodiment described with reference to FIGS. 1 and 2, the optical elements 3A, 3B are enclosed in mounts 5A, 5B. In principle, however, it is also possible to dispense with the mounts 5A, 5B and to form the bearing surfaces 15, 17, 19, 21, 23, 25 directly in the optical elements 3A, 3B. However, due to their wear behavior, the materials of refractive optical elements are generally not suitable for the construction of bearing surfaces with permanently good bearing and sliding properties. In this respect, the arrangement of the bearing surfaces 15, 17, 19, 21, 23, 25 in the mounts 5A, 5B for the optical elements 3A, 3B is advantageous. With regard to the guidance of the mounts 5A, 5B during the actuating movement, it is advantageous if in each case one V-shaped groove engages with the guide rods 11, 13 in both mounts 5A, 5B. In principle, this can be achieved by replacing the bearing surfaces 15, 21 with bearing surfaces such as the bearings 17, 19 and 23, 25, with the result that V-shaped grooves that lie opposite one another engage with the guide rods 11, 13, but this means that the advantage of the 3-point bearing, namely the self-centering, is lost and the friction is increased. In order to nevertheless achieve that V-shaped grooves engage with sides of the guide rods 11, 13 that lie opposite one another, it is possible to divide the mounts 5A, 5B into regions 27, 29, wherein in which of the mounts the V-shaped groove is located depends on the respective region 27, 29. In those regions 29 in which the V-shaped groove 17, 19 is located in the mount 5A located at the top in FIGS. 1 and 2, the mount 5B located at the bottom in FIGS. 1 and 2 has a flat bearing surface 15, and in those regions 27 in which the V-shaped groove 23, 25 is located in the mount 5B located at the bottom in FIGS. 1 and 2, the mount 5A located at the top in FIGS. 1 and 2 has a flat bearing surface 21. In addition, it is advantageous if, as is shown in FIGS. 1 and 2, in those regions 27, 29 in which a mount lies against the one guide rod with a V-shaped groove, this mount lies against the other guide rod with a flat bearing surface, and vice versa.

Figure 3:
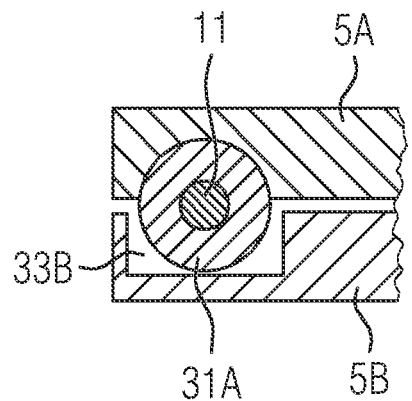
FIG. 3 shows a second exemplary embodiment for an optical assembly having two movable optical elements, in which both optical elements are guided together, in a sectional view.
Figure 4:
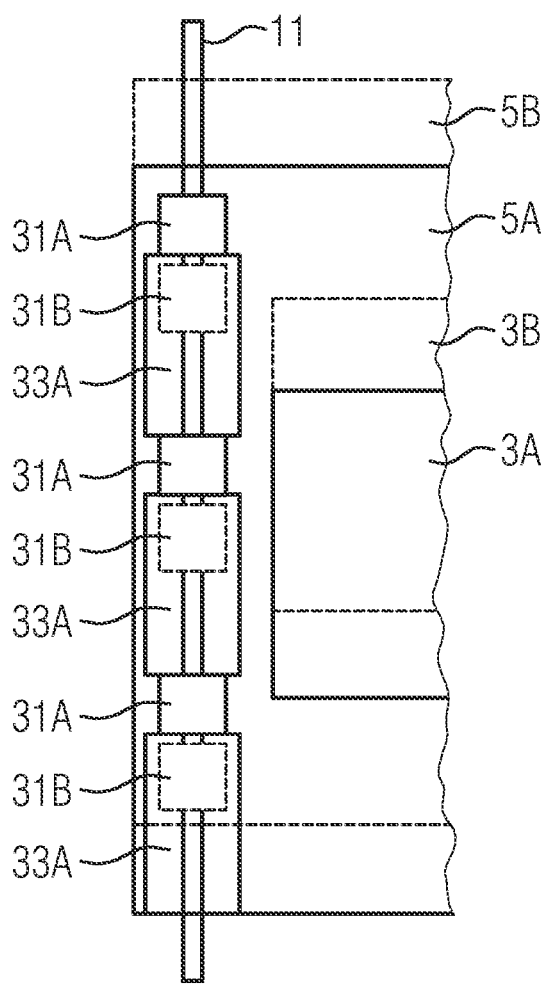
FIG. 4 shows the optical assembly from FIG. 3 in a top view.

A second exemplary embodiment for an optical assembly according to the invention is described below with reference to FIGS. 3 and 4.

The second exemplary embodiment for the optical assembly 1 differs from the first exemplary embodiment only in the design of the guide for the guided movement of the first optical element 3A and the guided movement of the second optical element 3B. The optical elements 3A, 3B themselves do not differ from the optical elements in the first exemplary embodiment. The mounts 5A, 5B also do not differ, apart from the design of the bearing elements with which they are mounted on the guide rod 11.

The bearing elements of the second exemplary embodiment are designed as plain bearing bushings 31A, 31B, which slide on the guide element, which, as in the first exemplary embodiment, is designed as a guide rail in the form of a guide rod 11. In the mount 5A, a plurality of such plain bearing bushings 31A are arranged one behind the other along the direction of extent of the guide rod 11 at a distance from one another. Cutouts 33B, in which the plain bearing bushings 31A of the first mount 5A can move along the guide rod 11, are located in the second mount 5B. The extent of the cutouts 33B along the guide rod 11 is selected to be so large that the plain bearing bushings 31A of the first mount 5A can be displaced over the entire required travel of the first optical element 3A. Correspondingly, the second mount 5B likewise has a number of plain bearing bushings 31B, which are located in cutouts 33A of the first mount 5A. The cutouts 33A have such dimensions along the direction of extent of the guide rod 11 that the plain bearing bushings 31B of the second mount 5B arranged in said cutouts can be moved along the guide rod 11 over the entire travel of the second optical element 3B. As in the first exemplary embodiment, two guide rods are also present in the second exemplary embodiment, of which only one is shown in FIGS. 3 and 4, however. As in the region of the first guide rod 11, the mounts 5A, 5B in the region of the second guide rod have plain bearing bushings and cutouts, which enable the plain bearing bushings to be moved over the entire travel.

In the second exemplary embodiment, in contrast to the first exemplary embodiment, no pretensioning of the mounts (5A, 5B) against one another is necessary, since the bearing bushings 31A, 31B cannot lose contact with the guide rods due to a form fit.

Figure 5:
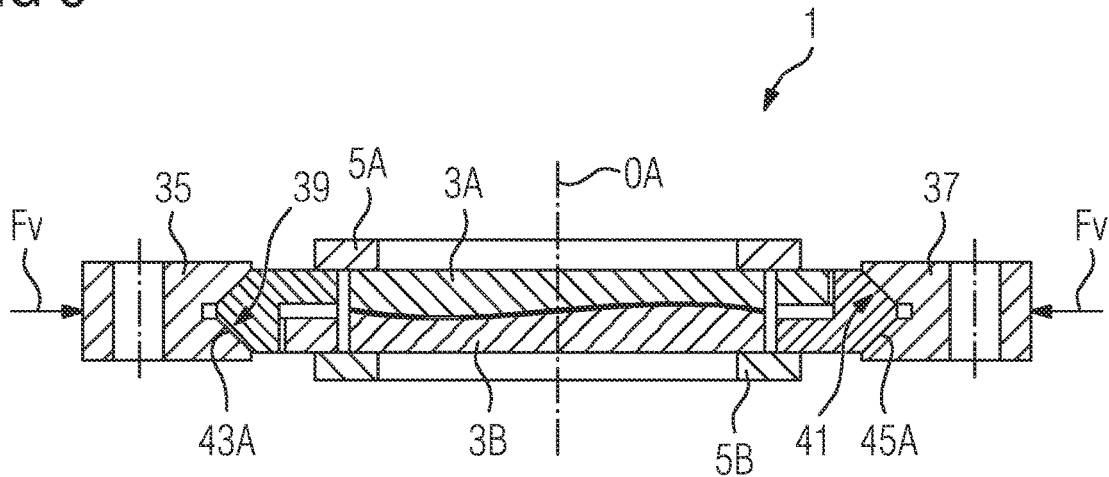
FIG. 5 shows a third exemplary embodiment for an optical assembly having two movable optical elements, in which a guide common to both optical elements is present, in a sectional view.
Figure 6:
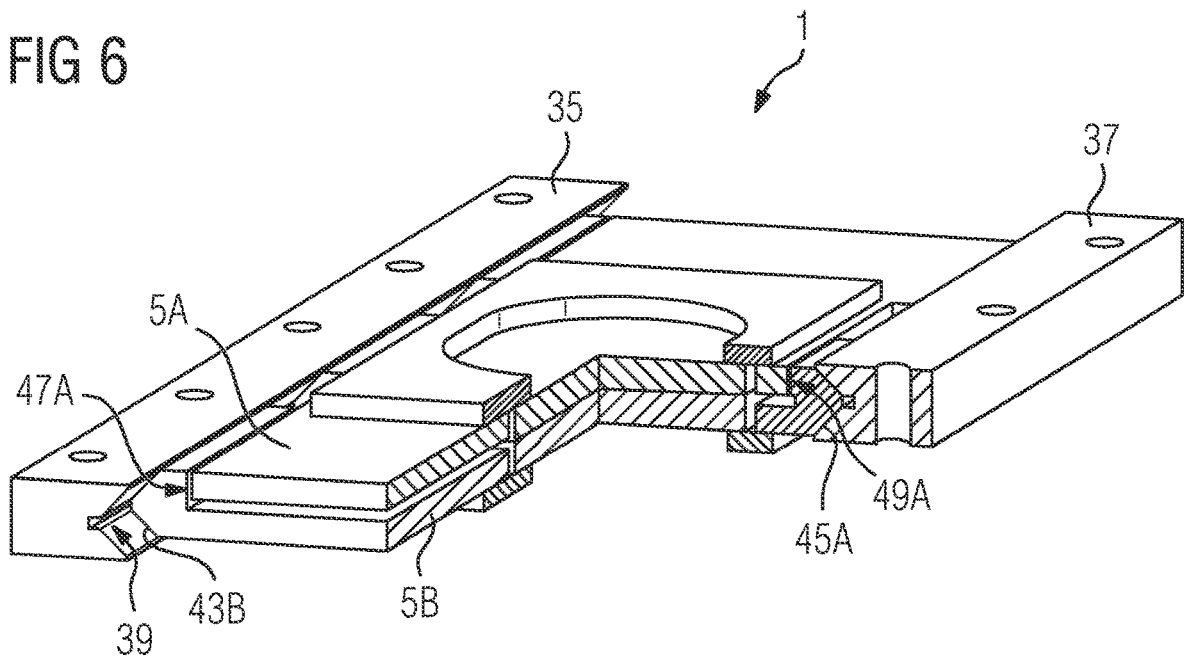
FIG. 6 shows the optical assembly from FIG. 5 in a perspective view.
Figure 7:
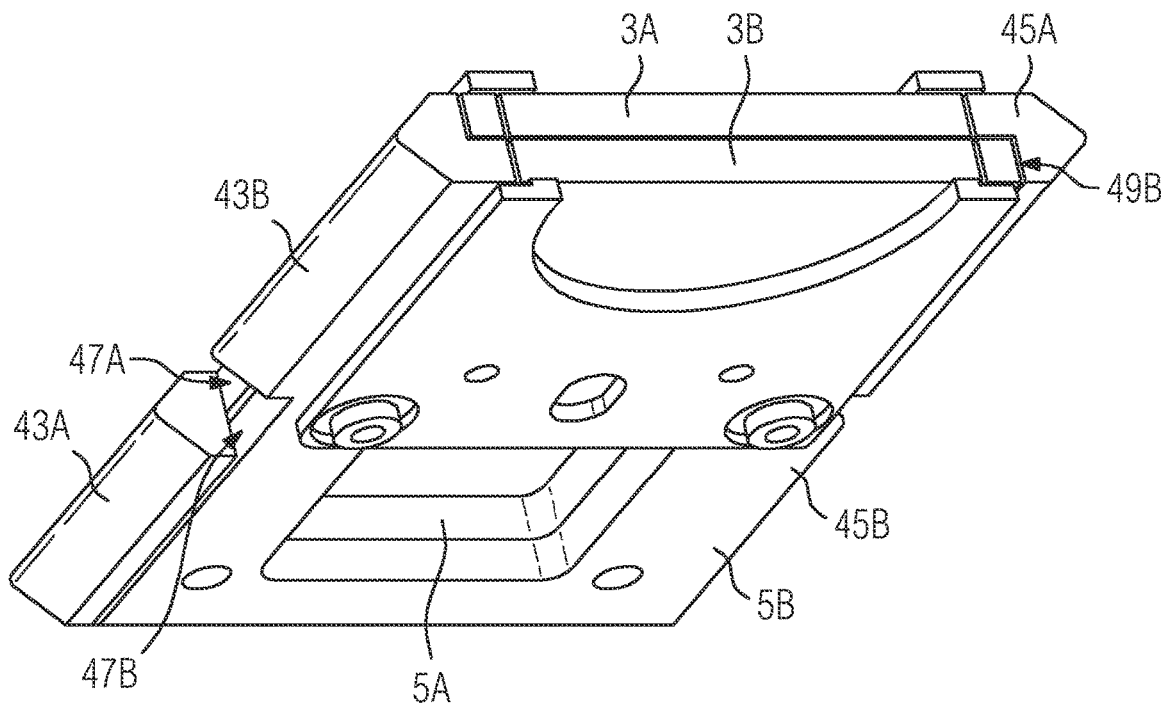
FIG. 7 shows the mounts of the optical elements of the optical assembly from FIG. 5 in a perspective view.

A third exemplary embodiment for an optical assembly according to the invention is shown in FIGS. 5 to 7. The optical elements 3A, 3B of the third exemplary embodiment correspond to those of the first two exemplary embodiments. They are therefore not described again in order to avoid repetition. The difference between the third exemplary embodiment and the two preceding exemplary embodiments lies in the type of guide that provides the guide path common to the two optical elements during the guided movement of the first optical element 3A and the guided movement of the second optical element 3B.

In the third exemplary embodiment, two guide rails 35, 37 are present as the guide elements, each of which has a V-shaped groove 39, 41. When the optical assembly is installed in an optical device, the guide rails 35, 37 are attached directly or indirectly to the housing of the device. Roof-edge-like sections 43A, 45A, 43B, 45B of the mounts 5A, 5B engage as bearing elements in the V-shaped grooves 39, 41 of the guide rails 35, 37. The surfaces of the roof-edge-like sections 43A, 43B, 45A, 45B are bearing surfaces which, together with the surfaces of the V-shaped grooves 39, 41, which also form bearing surfaces, in each case form a plain bearing. The common guide path is defined in this case by the guide rails 35, 37 with the V-shaped grooves 39, 41.

The roof-edge-shaped sections 43A, 45A, 43B, 45B extend along the guide rails 35, 37 not over the entire extent of the mounts 5A, 5B, but each have interruptions 47A, 47B, 49A, 49B in which the roof-edge-shaped sections 43A, 45A, 43B, 45B of the respective other mount 5A, 5B are then arranged (cf. FIG. 7). The interruptions have dimensions along the guide rails 35, 37 that are larger than the dimensions of the roof-edge-shaped sections in the respective interruptions 47A, 47B, 49A, 49B. The extent of the interruptions 47A, 47B, 49A, 49B is selected to be so large in this case that the roof-edge-like projections located therein can be displaced along the guide rails 35, 37 over the entire travel of the respective optical element 3A, 3B. The ease of the displacement of the optical elements 3A, 3B along the guide path can be set by a suitable pretensioning force $F_v$, which pretensions the V-shaped grooves 37, 39 in the direction of the roof-edge-like sections 43, 45.

In order to be able to fasten the two guide rails 35, 37 to the housing of an optical device in which the optical assembly is to be installed, it is possible to mount the guide rails 35, 37 on a carrier element (not shown in FIGS. 5 to 7), which in turn is mounted to the housing of the optical device.

The carrier element then defines the location of the optical assembly along the optical axis of the optical device. It additionally enables the azimuthal alignment of the optical assembly, i.e. the orientation of the optical assembly within a plane perpendicular to the optical axis, as well as centering of the optical assembly. The centering and the alignment can be realized in practice, for example, by a screw-on surface, a centering collar, and an azimuthal determination element. The running direction of the guide path can thus be clearly aligned or related to the interface of the optical device.

Figure 8:
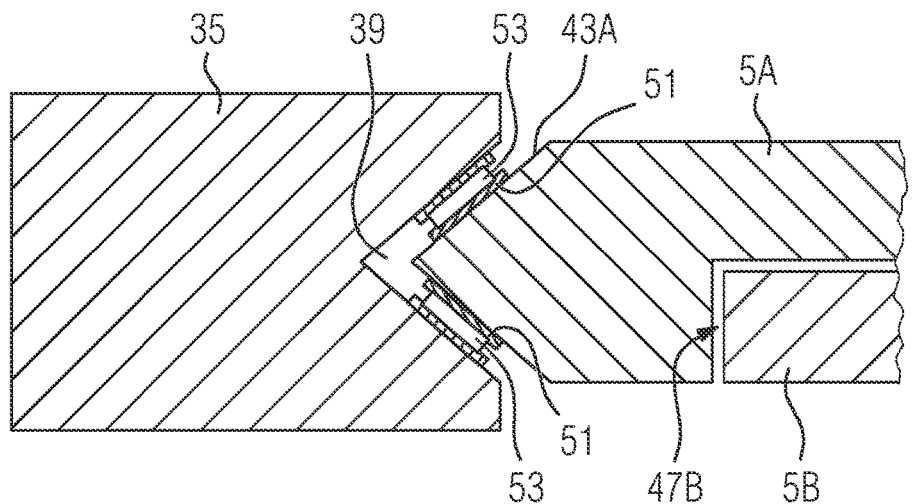
FIG. 8 shows a fourth exemplary embodiment for an optical assembly having two movable optical elements in which a guide common to both optical elements is present, in a sectional view.

A modification of the exemplary embodiment shown in FIGS. 5 to 7 for the optical assembly according to the invention is shown in FIG. 8. While in the exemplary embodiment shown in FIGS. 5 to 7 the surfaces of the roof-edge-like projections 43A, 43B, 45A, 45B together with the surfaces of the V-shaped grooves 39, 41 form plain bearings, the bearings in the exemplary embodiment shown in FIG. 8 are designed as roller bearings. For this purpose, cages with needles 53 are located between the surfaces of the roof-edge-like projections 43A, 43B, 45A, 45B. The extent of the cages along the guide rails 35, 37 is smaller in this case than the extent of a roof-edge-like projection along the guide rails. A suitable selection of the dimensions of the cages 51 in relation to the extent of the roof-edge-like projections 43A, 43B, 45A, 45B can ensure that the cages 51 do not delimit the available travel as they move during the displacement of the optical elements 3A, 3B to less than the travel made possible by the interruptions 47A, 47B, 49A, 49B. Rollers or balls can also be arranged in the cages 51 rather than the needles 53 described with reference to FIG. 8. In the case of roller cages, parallel roller cages could be used, wherein the design of the guide would substantially correspond to the design shown in FIG. 8 except for the cage, or cross roller cages, wherein the bearing elements would have a V-shaped groove rather than roof-edge-like projections like the guide rails. However, needle cages are more compact than roller cages, which means that needle cages are advantageous compared to roller cages with regard to the required installation space.

There are various possibilities for introducing the actuating force required for repositioning the mounts 5A, 5B carrying the optical elements 3A, 3B along their guide path. The introduction of an actuating force causing the repositioning can be accomplished, for example, by coupling a linearly acting drive, for example what is known as a voice coil motor, a linear motor, a piezo actuator, a piezo stepping drive, etc., or by coupling a rotationally acting drive, for example a DC motor, a stepping motor, a rotary drive based on a piezo stepping drive, etc., and the conversion of the rotary movement into a linear movement, for example by means of a cam mechanism, a lever mechanism, a worm gear, a traction mechanism, etc. Depending on the drive, the drive force or drive torque must be adequately dimensioned for the application of the corresponding actuating forces. In particular, the frictional forces that occur between the guide elements and the bearing elements and possibly frictional forces in the gear unit or a transmission must also be taken into account here.

The mounts 5A, 5B can either be moved by means of a common drive acting on both mounts 5A, 5B or in each case by means of a separate drive. The use of separate independent drives offers the advantage that an additional degree of freedom is available that can be used over the entire travel to compensate optical errors. As a result, the requirements in terms of the tolerances of the individual parts and the adjustment of the individual parts are lower.

Figure 9:
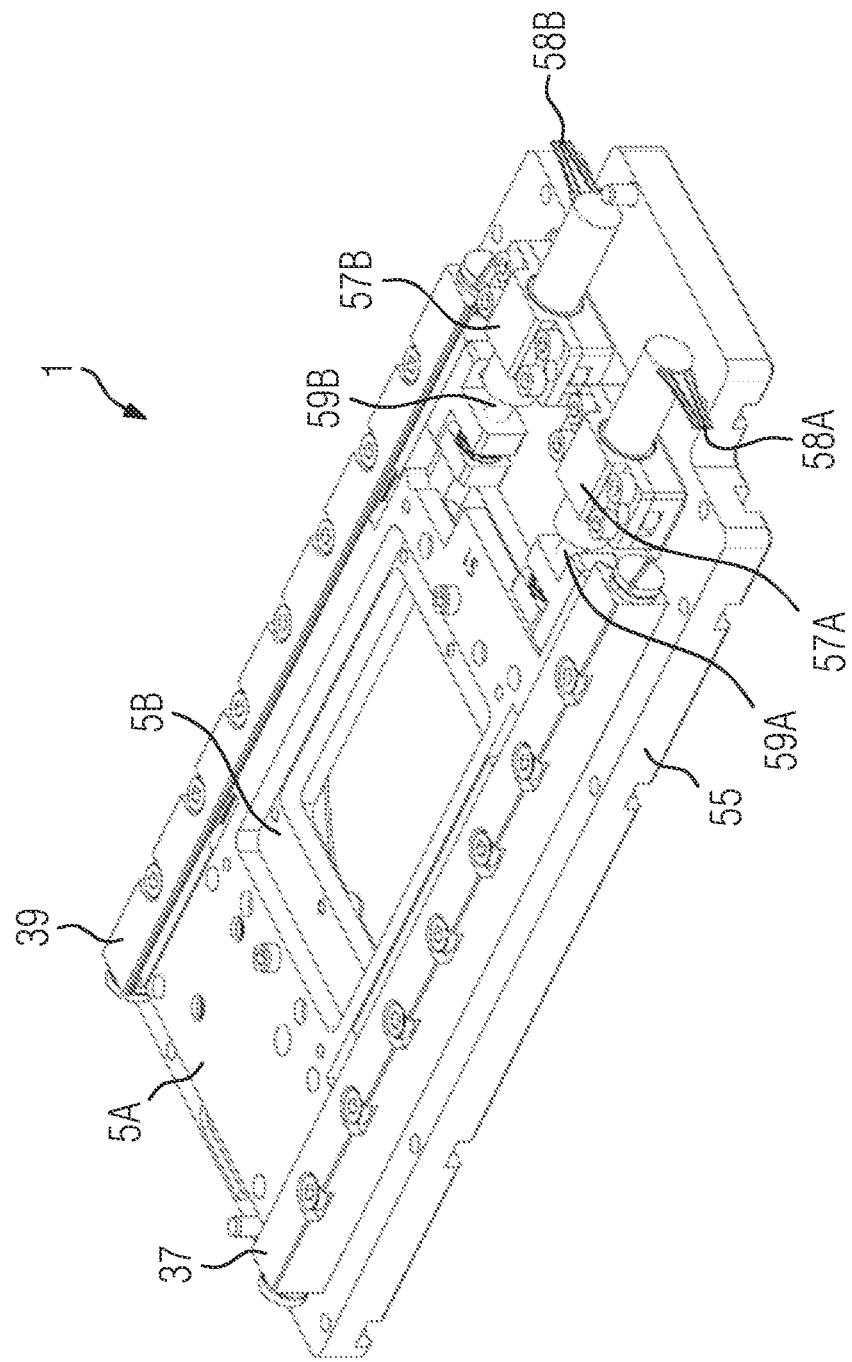
FIG. 9 shows an optical component with a drive device for introducing a driving force into the optical elements of the optical component in order to bring about the guided movement.

An example of an optical assembly 1 with separate drives for the mounts 5A, 5B is shown in FIG. 9. The guide rails 37, 39 are attached to a carrier element 55, which can be installed into an optical device. In addition, two DC motors 57A, 57B are arranged on the carrier element 55, each of which acting on one of the mounts 5A, 5B to introduce the actuating force. The rotary movements of the DC motors 57A, 57B are converted into linear movements of the mounts 5A, 5B by means of a spindle gear. Instead of the DC motors, other rotationally acting motors can also be used. Linear motors can also be used instead of rotationally acting motors, in which case the gear unit for converting the rotary movement into a linear movement can be dispensed with. In addition to linear motors, suitable linearly acting drives are piezo actuators, piezo stepping drives, or the like. When using piezo actuators and piezo stepping drives, a lever mechanism is usually required for larger travels in the millimeter range, since the piezo actuators generally only allow actuating movements in the range of a few micrometers. For this, however, very fast actuating movements with high dynamics are possible. If piezo stepping drives are used, the mode of operation of which is based on the stick-slip effect, it is advantageous if roller bearings are used for guiding, as has been described with reference to FIG. 8, so that the actuating movement can be carried out reliably. In the present exemplary embodiment, the stationary part of the respective drive 57A, 57B is arranged on the carrier element 55, with the result that the power cables 58A, 58B for supplying the drives 57A, 57B do not have to follow any movement. Incorrect positioning due to forces introduced into the moving optical elements by the cables can thus be avoided.

It is advantageous if the position of the optical elements 3A, 3B along their guide path can be detected. Since the optical elements 3A, 3B are firmly connected to the mounts 5A, 5B, it is sufficient to capture the position of the mounts 5A, 5B along the guide path with an absolutely measuring system or a relatively measuring system plus a reference mark, for example an end location. For this purpose, for example, linear scales with integrated or separate marks for an end location or a reference location can be applied to the mounts 5A, 5B. The linear scales can here act magnetically or optically. The sensor system, which can consist of a measuring head, a slotted coupler, or a reflective coupler, is firmly connected to the carrier element 55.

By detecting the position of the optical elements 3A, 3B along the guide path, it becomes possible to establish control loops, which make a particularly precise, high level of accuracy in terms of the positioning of the optical elements 3A, 3B possible. For the detection of the end locations and/or reference locations, for example switching contacts, contrast differences, which are evaluated, for example, by means of reflective couplers, slotted optocouplers, etc. can be used.

Although in the present exemplary embodiment the scale is arranged on the mounts 5A, 5B and the sensor system on the carrier element 55, the reverse arrangement, i.e. the arrangement of the scale on the carrier element 55 and the sensor system on the moving mounts 5A, 5B, is also possible. The spatially fixed arrangement of the sensor system on the carrier element 55, however, has the advantage that no electrical connections have to follow any movement, so that incorrect positioning due to forces introduced into the moving optical elements by cables can be avoided.

Figure 10:
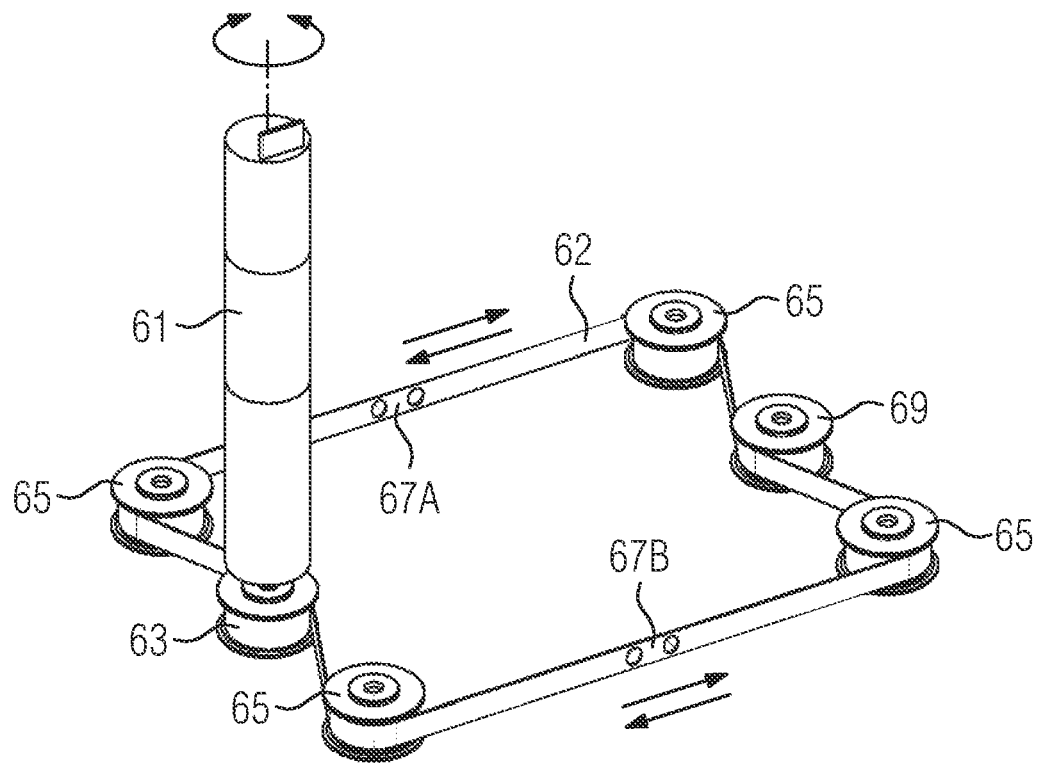
FIG. 10 shows a rotary drive with a traction mechanism.

In the exemplary embodiment shown in FIG. 9, the mounts 5A, 5B are each moved by means of separate motors. Alternatively, however, it is also possible to provide only a single motor that acts on both mounts 5A, 5B in order to displace them in opposite directions to one another along the guide path. This can be done, for example, with the aid of a traction mechanism, as shown in FIG. 10. A DC motor or a stepping motor 61 transmits its rotary movement by means of a drive wheel 63 to a revolving traction means, such as a belt, a chain, a rope, etc. In order to change the direction of the linear movement, appropriate deflection rollers 65 are provided. In the regions in which the traction means 62 performs a linear movement, interfaces 67A, 67B are present, via which the traction means 62 is coupled to the mount 5A and the mount 5B, respectively. In order to keep the drive slack low, the traction mechanism additionally includes a tensioning roller 69 with the aid of which the traction means 62 can be tensioned. The setting of the tensioning roller 69 when the optical component is put into operation can be permanent, wherein a check should be carried out from time to time. Alternatively, automatic setting can take place, which can be brought about, for example, by a permanently acting spring mechanism which keeps the traction means 62 under tension.

In the illustration of the traction mechanism shown in FIG. 10, the traction means 62 only lies against the drive wheel 63. Alternatively, it is possible that the traction means 62 wraps around the drive wheel 63 several times, whereby the drive slack can be minimized when the direction is reversed.

Figure 11:
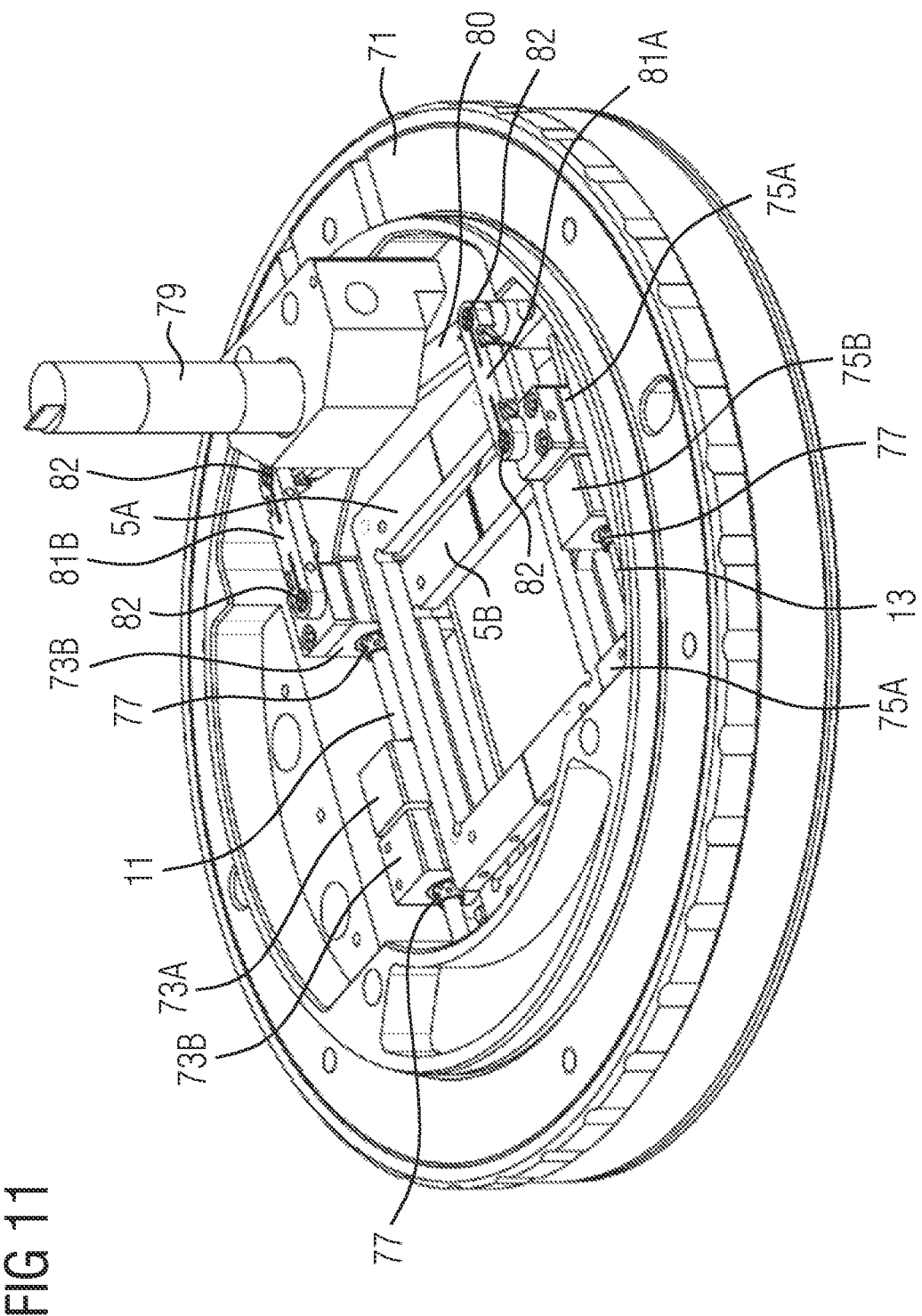
FIG. 11 shows a rotary drive with a lever mechanism.

Another embodiment variant of a rotary drive with a gear unit converting the rotary drive movement into a linear movement is shown in FIG. 11. This figure shows a component 71 of the housing of an optical device to which guide rods 11, 13 of an optical assembly according to the invention are attached. The mounts 5A, 5B have bearing elements 73A, 73B, 75A, 75B that are provided with holes through which the guide rods 11, 37 extend. The guide rods 11, 13 encompassing ball cages 77 are located in the holes, i.e. a roller bearing guide is implemented. When a mount 5A, 5B is displaced by a specific travel, the cages 77 each lie back by a distance that corresponds to half of that travel. As in the second exemplary embodiment, contact between the bearing elements 73A, 73B, 75A, 75B and the guide rods 11, 13 is ensured due to a form fit, so that there is no need for pretensioning.

In the exemplary embodiment shown in FIG. 11, a DC motor or a stepping motor 79 is provided as a rotary drive acting on a rocker 80. The two ends of the rocker 80 are each connected to one of the mounts 5A, 5B via a push-pull rod 81A, 81B. The rocker 80 and the push-pull rods 81A, 81B form a lever mechanism, with the aid of which the rotary movement of the DC motor or stepping motor 79 is converted into the linear movement of the mounts 5A, 5B. Torsion spring joints can be used at the articulation points 82 of the lever mechanism in order to ensure that the rotary movement of the DC motor or a stepping motor 79 is converted into the linear movement with as little play as possible. The torsion spring joints can be pretensioned in one direction and thus make a largely play-free conversion of movement possible.

In addition to the previously described movement along a common guide path, it is possible to move the two optical elements transversely to their common guide path. For example, in the case of optical elements with free-form surfaces, the correction field for optical errors can be expanded in this way, or guidance errors in the main guidance can be compensated. Further drives or guides for the transverse direction are required for this.

So far, only exemplary embodiments for optical assemblies having two optical elements guided along a common guide path have been described. However, the invention can also be used to guide more than two optical elements along a common guide path. An exemplary embodiment for an optical assembly having three optical elements guided along a common guide path is shown schematically in FIG. 12. A third mount 5C having a further optical element is located between two outer mounts 5A, 5B having optical elements. The mounts 5A, 5B, 5C are each mounted on a guide rod 11 so as to be displaceable by means of bearing elements 83A, 83B, 83C, for example in the form of plain bearing bushings. Interruptions 85A, 85B, 385C are present between the bearing elements 83A, 83B, 83C of a mount 5A, 5B, 5C, which allow the bearing elements 83A, 83B, 83C of the other mounts 5A, 5B, 5C to be displaced within the interruption 85A, 85B, 85C along the guide rod 11. As a person skilled in the art will readily recognize, this concept can also be transferred to optical assemblies having more than three optical elements.

It should be pointed out at this point that, in embodiment variants of the invention having three or more optical elements in an optical assembly, all optical elements or their mounts can be guided along a common guide path, but this does not necessarily have to be the case within the scope of the invention. In the context of the present invention, however, at least two of the optical elements of an optical assembly or their mounts have a common guide. In the case of more than two optical elements, there is also the possibility that they have a common guide as respective pairs. The direction of movement of the guided movement of a pair can coincide with that of another pair or extend at an angle thereto, for example 90°. In this way, for example, a zoom system can be set up that corrects different aberrations, into which different aberrations are introduced, or in which aberrations associated with the optical magnification or a similar variable are corrected. An optical element can in principle also belong to two pairs, for example if the guide rods or guide rails of one pair are displaceable along the guide path of the other pair.

The present invention has been described in detail on the basis of exemplary embodiments for explanatory purposes. However, a person skilled in the art will recognize that it is possible to deviate from the exemplary embodiments described within the scope of the present invention. The invention should therefore not be defined by the exemplary embodiments, but only by the appended claims.

LIST OF REFERENCE SIGNS

1 Optical assembly
3 Optical element
5 Mount
7 Plane surface
9 Freeform surface
11 Guide rod
13 Guide rod
15 Bearing surface
17 Bearing surface
19 Bearing surface
21 Bearing surface
23 Bearing surface
25 Bearing surface
27 Section
29 Section
31 Plain bearing bushing
33 Cutout 35 Guide rail
37 Guide rail
39 V-shaped groove
41 V-shaped groove
43 Roof edge-like projection
45 Roof edge-like projection
47 Interruption
49 Interruption
51 Cage
53 Needle
55 Carrier element
57 Motor
58 Power cable
59 Spindle gear
61 Motor
62 Traction means
63 Drive wheel
65 Deflection roller
67 Interface
69 Tensioning roller
71 Component
73 Bearing element
75 Bearing element
77 Cage
79 Motor
80 Rocker
81 Push-pull rod
82 Articulation point
83 Bearing element

The invention claimed is:

1. An optical assembly, comprising:
a first optical element;
a second optical element,
wherein the first optical element and the second optical element are arranged to be movable in a guided manner; and
a common guide for first optical element and the second optical element which, when the first optical element and the second optical element are moved in a guided manner, provides a guide path that is common to the first optical element and the second optical element,
wherein the common guide comprises at least one guide element on which the first optical element and the second optical element are each mounted via bearing elements, and
wherein the first optical element and the second optical element are arranged one behind the other along an axis and are guided in a movable manner parallel to a plane perpendicular to the axis.

2. The optical assembly of claim 1, wherein the bearing elements are formed on the first optical element and the second optical element with the common guide.

3. The optical assembly of claim 1, wherein the first optical element and the second optical element with the common guide are each arranged in a mount and the bearing elements are formed on the mount.

4. The optical assembly of claim 1, wherein the at least one guide element comprises at least one guide rail on which the first optical element and the second optical element with the common guide are mounted at least indirectly in each case via the bearing elements.

5. The optical assembly of claim 4, wherein the at least one guide element comprises a first guide rail and a second guide rail, and the first optical element and the second optical element with the common guide are mounted at least indirectly in each case via the bearing elements at least on the first guide rail and on the second guide rail.

6. The optical assembly of claim 5, wherein the first guide rail comprises at least one guide rod, which is at least partially enclosed by the bearing elements.

7. The optical assembly of claim 6, wherein the bearing elements enclose a rolling body engaging with the at least one guide rod.

8. The optical assembly of claim 6, wherein the bearing elements are bearing surfaces that make contact with the at least one guide rod.

9. The optical assembly of claim 8, wherein the bearing surfaces make contact with the at least one guide rod such that a 3-point bearing is provided.

10. The optical assembly of claim 4, wherein the at least one guide rail comprises at least one guide groove, and the bearing elements comprise projections engaging in the at least one guide groove.

11. The optical assembly of claim 10, wherein a rolling body is arranged between the at least one guide groove and the projections engaging in the at least one guide groove.

12. The optical assembly of claim 1, wherein the bearing elements and the at least one guide element are pretensioned with respect to one another.

13. The optical assembly of claim 1, wherein the bearing elements and the at least one guide element are paired in a form-fitting manner.

14. The optical assembly of claim 1, wherein the bearing elements and/or the at least one guide element has or includes a sliding coating.

15. The optical assembly of claim 1, wherein in each of the first optical element and the second optical element with the common guide, the bearing elements comprise in each case at least one cutout or interruption extending along the at least one guide element, in which cutout or interruption at least one bearing element of at least one of the first optical element and the second optical element with the common guide is arranged, and the cutouts or interruptions have a larger dimension along the at least one guide element than the bearing element arranged in the respective cutout or interruption.

16. The optical assembly of claim 1, further comprising a drive device at least indirectly acting on at least one of the first optical element and the second optical element with the common guide to introduce an actuating force bringing about the guided movement.

17. The optical assembly of claim 16, wherein the drive device comprises a separate drive for each of the first optical element and the second optical element with the common guide to drive the respective first optical element and second optical element.

18. The optical assembly of claim 1, further comprising a detector for detecting the positions of the first optical element and the second optical element with the common guide.

19. The optical assembly of claim 1, further comprising elements supplied with electricity, the elements supplied with electricity being arranged in a spatially fixed way such that the elements supplied with electricity do not move with the first optical element and the second optical element during the guided movements of the first optical element and the second optical element.

20. A wavefront manipulator for manipulating the wavefront of an electromagnetic wave, comprising the optical assembly of claim 1.

21. A method for the guided movement of at least a first optical element and a second optical element of an optical assembly, the method comprising:

moving the first optical element and the second optical element based on a guide common to the first optical element and the second optical element;
providing a guide path common to the first optical element and the second optical element via at least one guide element;
mounting the first optical element and the second optical element on the at least one guide element via bearing elements;
arranging the first optical element and the second optical element one behind the other along an axis; and
guiding the first optical element and the second optical element in a movable manner parallel to a plane perpendicular to the axis.

* * * * *